United States Patent Office 2,974,698
Patented Mar. 14, 1961

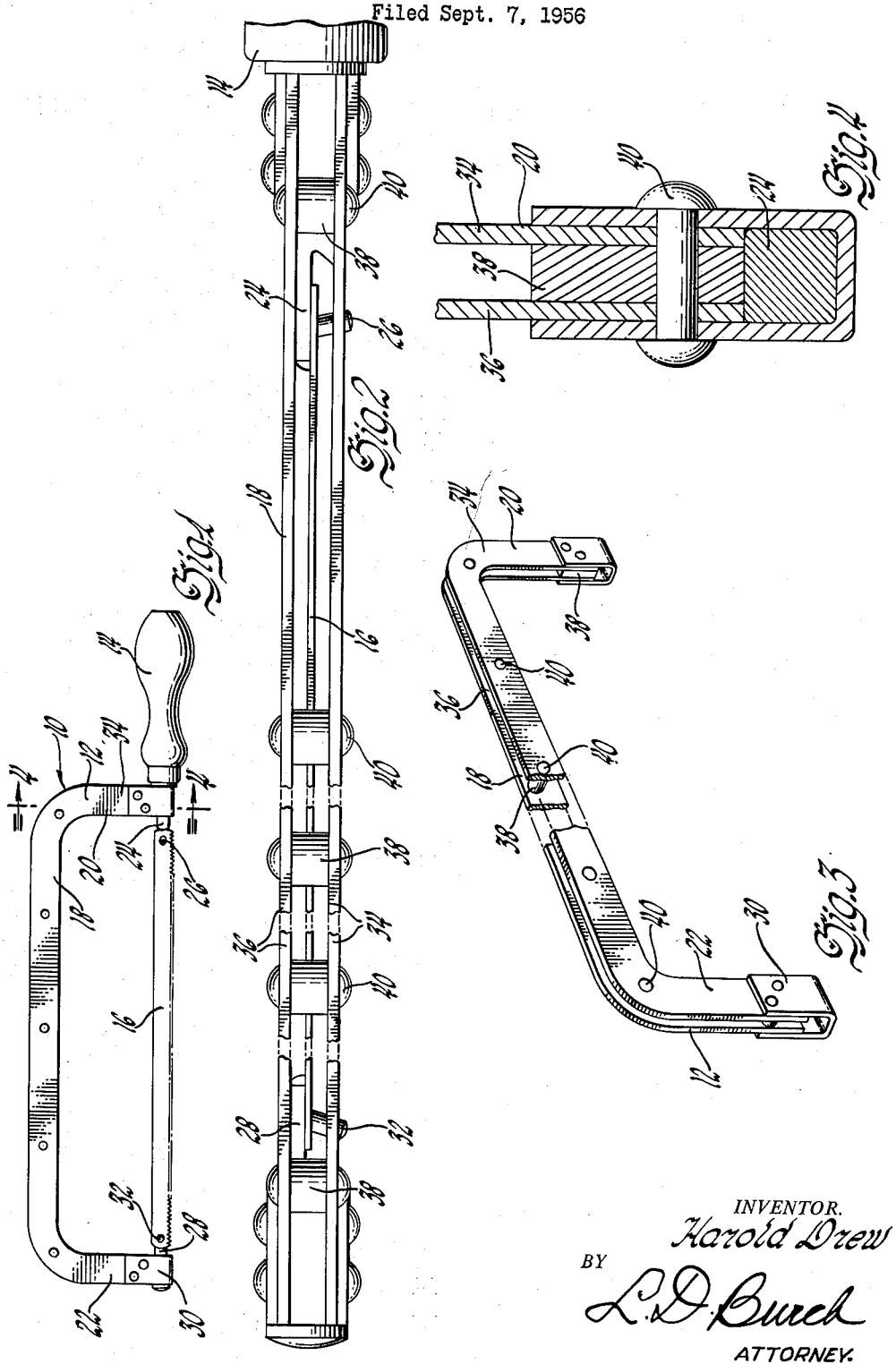

2,974,698
HACK SAW

Harold Drew, 1066 Stratford Lane,
Bloomfield Hills, Mich.

Filed Sept. 7, 1956, Ser. No. 608,502

2 Claims. (Cl. 145—33)

This invention relates to a hand tool, the preferred embodiment being disclosed as a hack saw.

It has been proposed to provide a hand tool which can be more accurately aligned on a workpiece. In previous hand tools such as hack saws it has often been found that the frame or other supporting member of the tool obstructed a direct view of the working edge of the tool when such a view is most needed, namely when the edge is being aligned with a scribe line or other mark. It is now proposed to make the frame of a hand tool in two pieces spaced apart so that the blade or other working edge of the tool may be easily seen and aligned with a scribe line on the workpiece.

Referring to the drawing, Figure 1 shows a side elevation of a hack saw utilizing the invention.

Figure 2 is a top view of the hack saw shown in Figure 1.

Figure 3 is a perspective view of the hack saw frame.

Figure 4 is a cross sectional view taken along line 4—4 of Figure 1.

Hack saw 10 comprises a frame 12, a handle 14 and a blade 16. Frame 12 is formed to include a back 18 and drop arms 20, 22. An adjustable spindle 24 is mounted in the outer end of drop arm 20 and has handle 14 removably attached thereto. Spindle 24 is also provided with a laterally projecting retaining pin or lug 26 which is adapted to extend through a hole in the blade 16 and provide a means of attaching the blade to spindle 24. Blade tightening means of standard design, not shown, is associated with spindle 24 and handle 14. Drop arm 22 has a blade-holding spindle 28 removably mounted in the foot 30. Spindle 28 is also provided with a laterally projecting retaining pin 32 by means of which blade 16 is mounted to the forward end of the hack saw frame. The back and drop arms of the frame are comprised of parallel bridge members or rails 34 and 36 having spacers 38 provided to keep the bridge members in spaced relation. The bridge members are secured together by any well-known securing means, such as rivets 40, passing through spacers 38 and apertures provided in the bridge members.

When the hack saw has a blade assembled on the retaining lugs and tightened, as is well known in the art, the plane of the blade 16 will pass between the respective planes occupied by rails 34 and 36 and will be parallel thereto. The operator may then sight through the space between the rails and see blade 16. The blade can then be accurately aligned with a scribe line on the workpiece to be sawed and the operator may more accurately follow the line while sawing.

This invention may also be incorporated in other types of hand tools having a working edge which must be accurately aligned on a workpiece.

What is claimed is:

1. A tool frame including two generally U-shaped longitudinally extending parallel frame members secured together in spaced relation, spacers secured therebetween, and blade mounting elements attached to the legs of said U-shaped member to secure a blade in said frame, said spaced parallel frame members defining a vertical sight whereby the blade may be aligned on a workpiece.

2. In a saw having a removable blade, a frame including a pair of parallel U-shaped rails fastened together in adjacent spaced relation by rivets and spacers and defining a frame back portion and depending end portions, a U-shaped members to secure a blade in said frame, said tion and cooperating therewith to support blade-holding spindles therein whereby said blade spindles are rotatably fixed relative to said rails and hold said blade in spaced relation to said back portion and said end portions and in a plane intermediate and parallel to the planes of said rails whereby said blade may be viewed through the narrow slot defined by said rails and aligned directly on a workpiece.

References Cited in the file of this patent

UNITED STATES PATENTS

| 709,553 | Morrison | Sept. 23, 1902 |
| 2,320,363 | Kabigting | June 1, 1943 |
| 2,421,567 | Krause | June 3, 1947 |

FOREIGN PATENTS

| 400,299 | Great Britain | Oct. 26, 1933 |
| 940,751 | France | June 7, 1948 |